US012684144B2

(12) United States Patent (10) Patent No.: US 12,684,144 B2
Oh et al. (45) Date of Patent: Jul. 14, 2026

(54) METHOD FOR DECODING IMMERSIVE VIDEO AND METHOD FOR ENCODING IMMERSIVE VIDEO

(71) Applicants: Electronics and Telecommunications Research Institute, Daejeon (KR); IUCF-HYU (Industry-University Cooperation Foundation Hanyang University), Seoul (KR)

(72) Inventors: Kwan-Jung Oh, Daejeon (KR); Gwangsoon Lee, Daejeon (KR); Euee-S. Jang, Seoul (KR); Jai-Young Oh, Seoul (KR); Tian-Yu Dong, Seoul (KR); Xin Li, Seoul (KR)

(73) Assignees: Electronics and Telecommunications Research Institute, Daejeon (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 18/638,119

(22) Filed: Apr. 17, 2024

(65) Prior Publication Data

US 2024/0348807 A1 Oct. 17, 2024

(30) Foreign Application Priority Data

Apr. 17, 2023 (KR) ........................ 10-2023-0050344
Oct. 6, 2023 (KR) ........................ 10-2023-0133815
Oct. 19, 2023 (KR) ........................ 10-2023-0140631

(51) Int. Cl.
H04N 19/30 (2014.01)
H04N 19/136 (2014.01)
(Continued)

(52) U.S. Cl.
CPC ........... *H04N 19/30* (2014.11); *H04N 19/136* (2014.11); *H04N 19/182* (2014.11); *H04N 19/20* (2014.11); *H04N 19/46* (2014.11)

(58) Field of Classification Search
CPC .... H04N 19/30; H04N 19/136; H04N 19/182; H04N 19/20; H04N 19/46
See application file for complete search history.

(56) References Cited

U.S. PATENT DOCUMENTS 10,789,723 B1 * 9/2020 Kopf ...................... G06N 3/088
2008/0075358 A1 3/2008 Yu et al.
2021/0209807 A1 * 7/2021 Oh ........................ H04N 21/816

FOREIGN PATENT DOCUMENTS

KR 10-2009-0111939 A 10/2009
KR 10-0922544 B1 10/2009
(Continued)

OTHER PUBLICATIONS

Salahieh et al. "Object-Based Applications for Immersive Video Coding" *International Organisation for Standardisation ISO/IEC JTC1/SC29/WG11*, Oct. 2019 (pp. 1-6).
(Continued)

*Primary Examiner* — Jae N Noh
(74) *Attorney, Agent, or Firm* — NSIP Law

(57) ABSTRACT

An image encoding method according to the present disclosure may include generating an atlas based on a plurality of viewpoint images; encoding the atlas; and encoding metadata for the atlas. In this case, the metadata may include first information showing whether a viewpoint image is a background image.

11 Claims, 11 Drawing Sheets
(4 of 11 Drawing Sheet(s) Filed in Color)

(51) Int. Cl.
H04N 19/182 (2014.01)
H04N 19/20 (2014.01)
H04N 19/46 (2014.01)

(56) References Cited

FOREIGN PATENT DOCUMENTS

| KR | 10-0926520 B1 | 11/2009 |
| WO | WO 2020/232281 A1 | 11/2020 |

OTHER PUBLICATIONS

Boyce et al. "MPEG Immersive Video Coding Standard" *Proceedings of the IEEE,* vol. 109 No. 9. Sep. 2021 (pp. 1-16).

* cited by examiner

【FIG. 1】
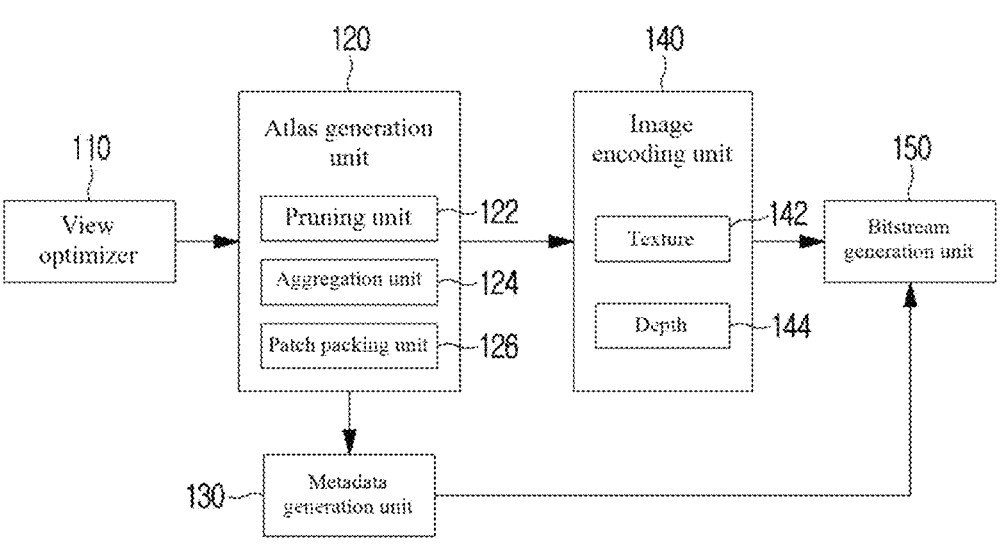

【FIG. 2】
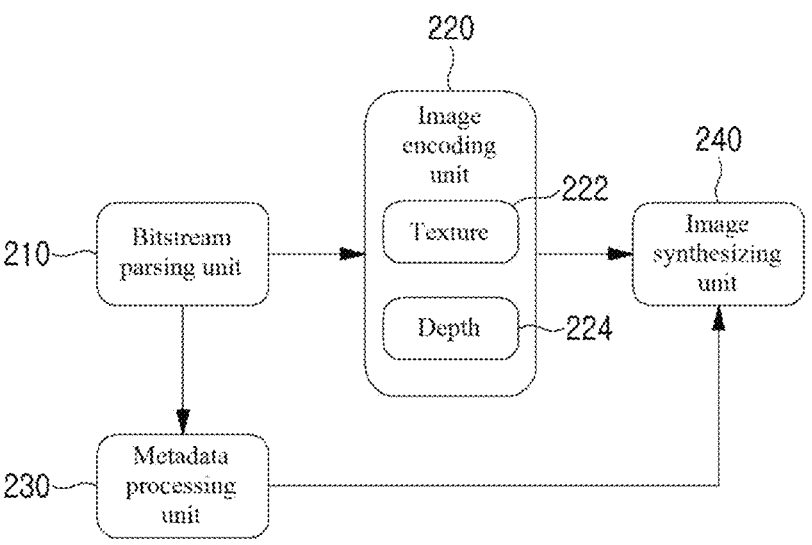

【FIG. 3】
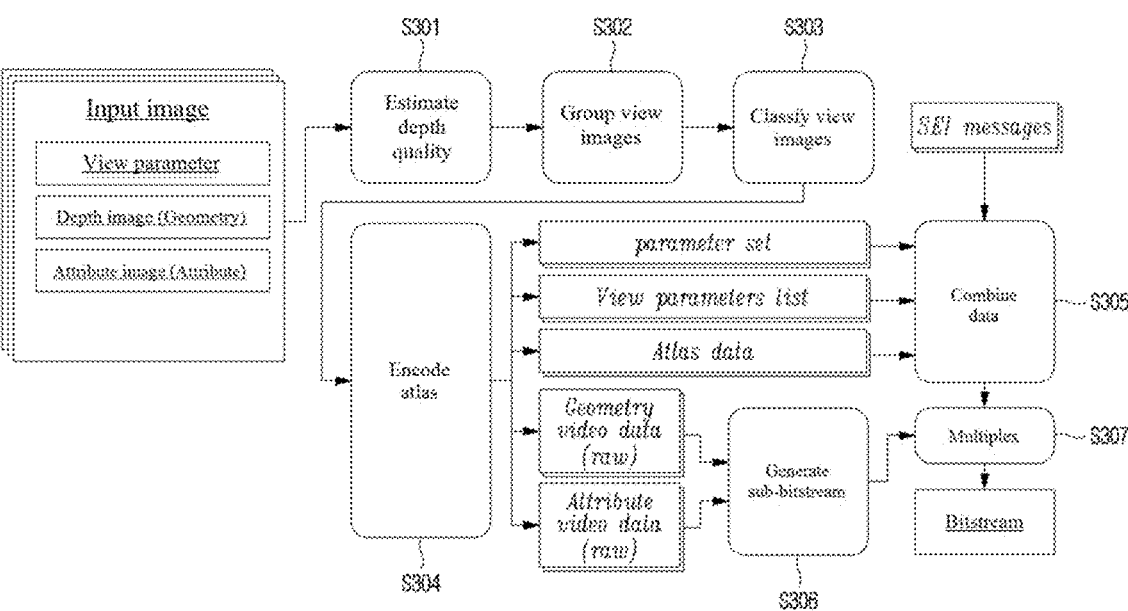

【FIG. 4】
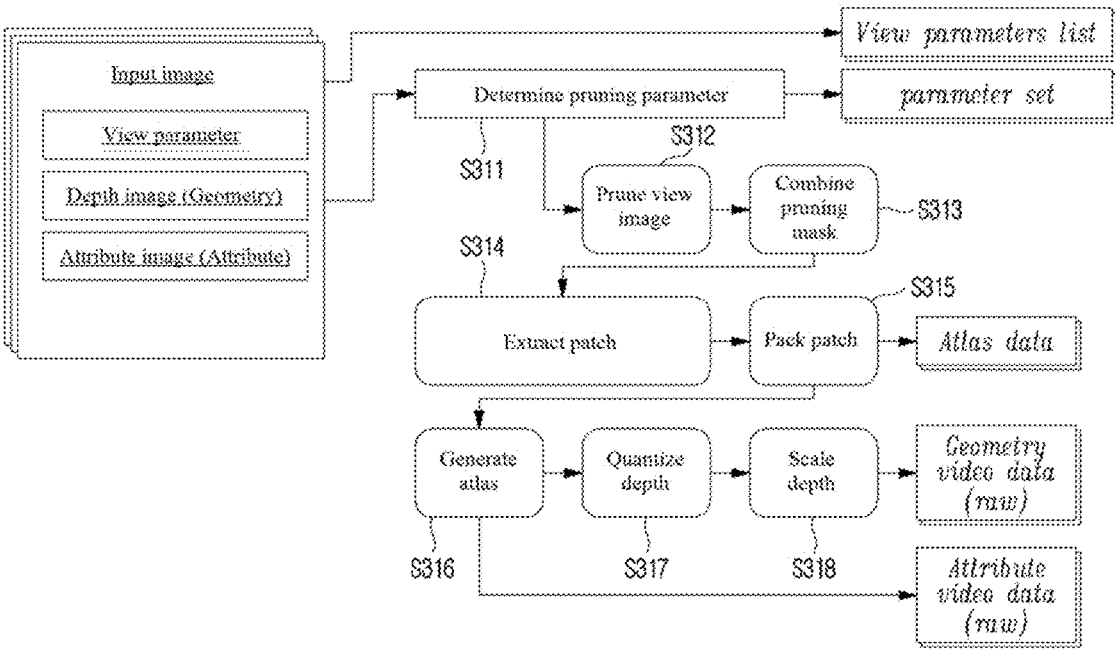

【FIG. 5】
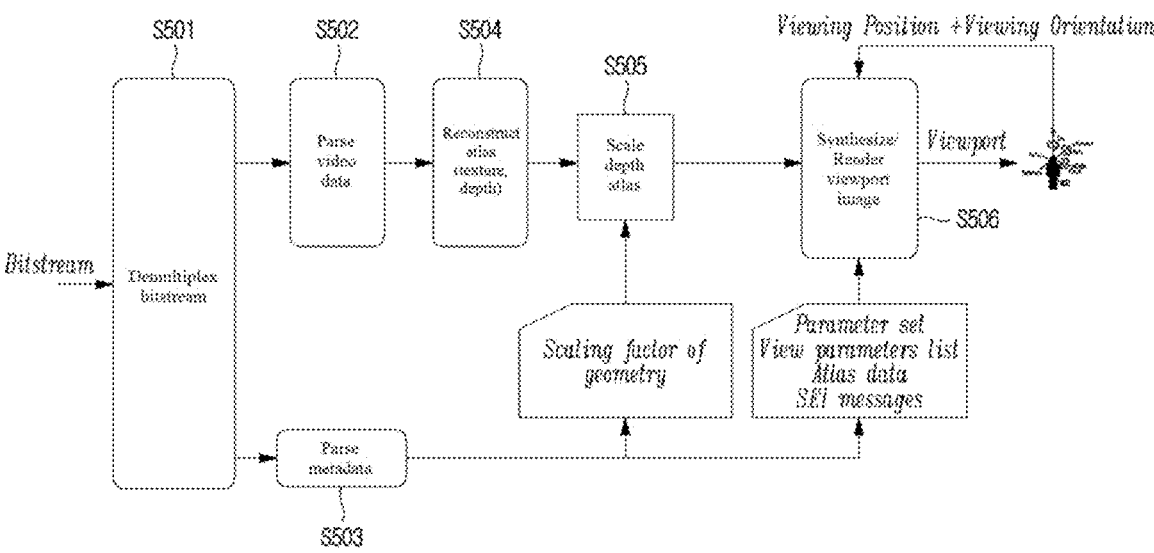

【FIG. 6】
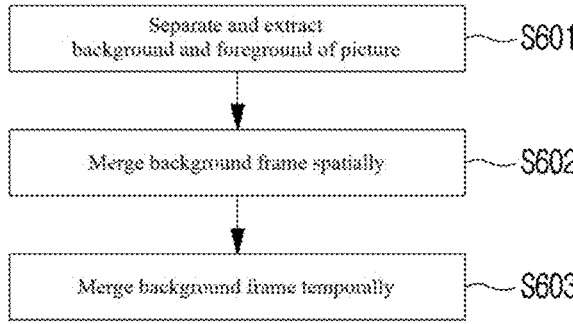
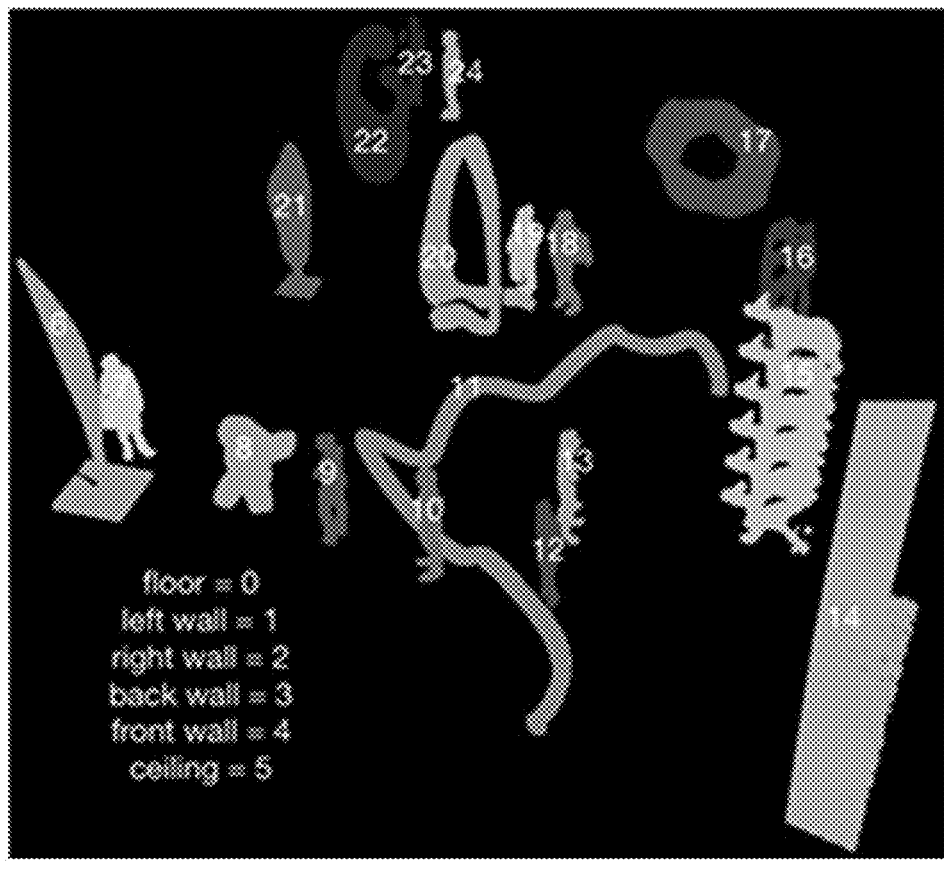
floor = 0
left wall = 1
right wall = 2
back wall = 3
front wall = 4
ceiling = 5
【FIG. 7】

【FIG. 8】

【FIG. 9】
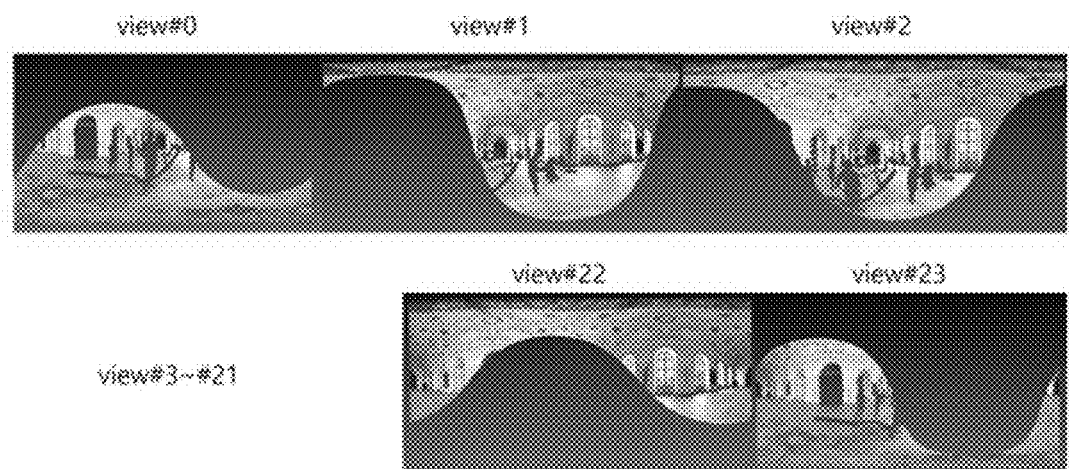
【FIG. 10】

【FIG. 11】
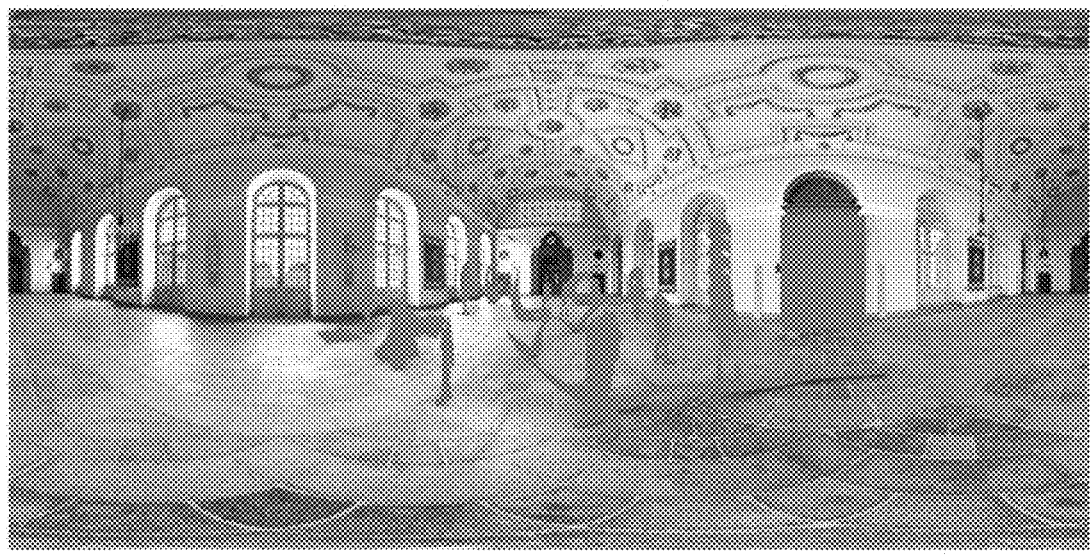
【FIG. 12】
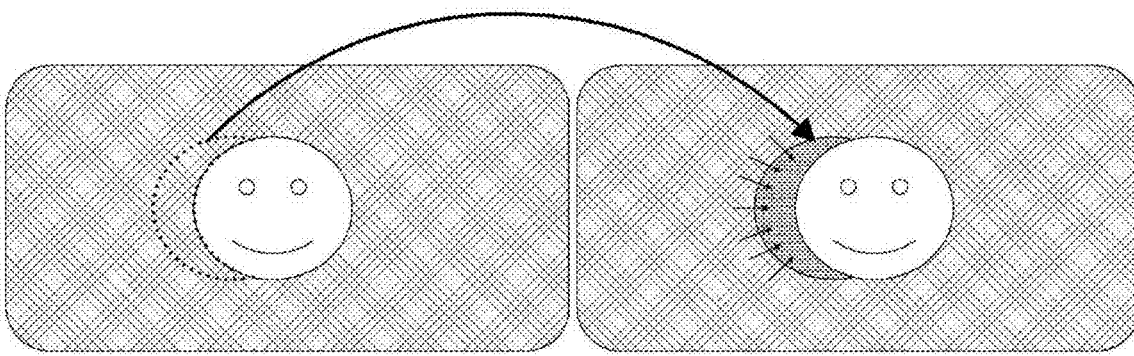
【FIG. 13】
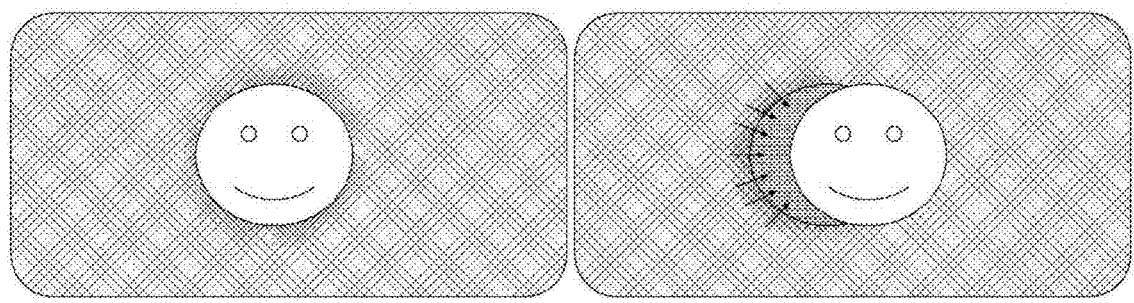

【FIG. 14】
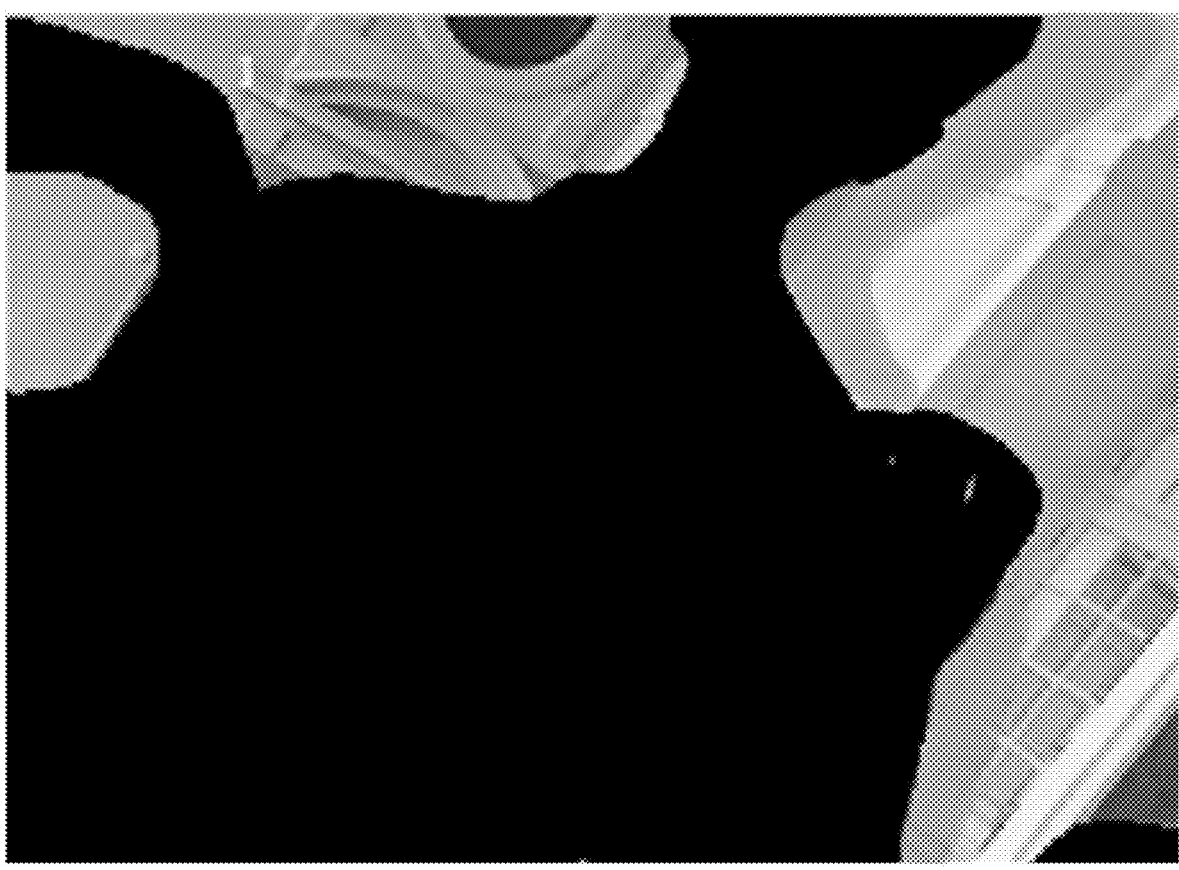
【FIG. 15】
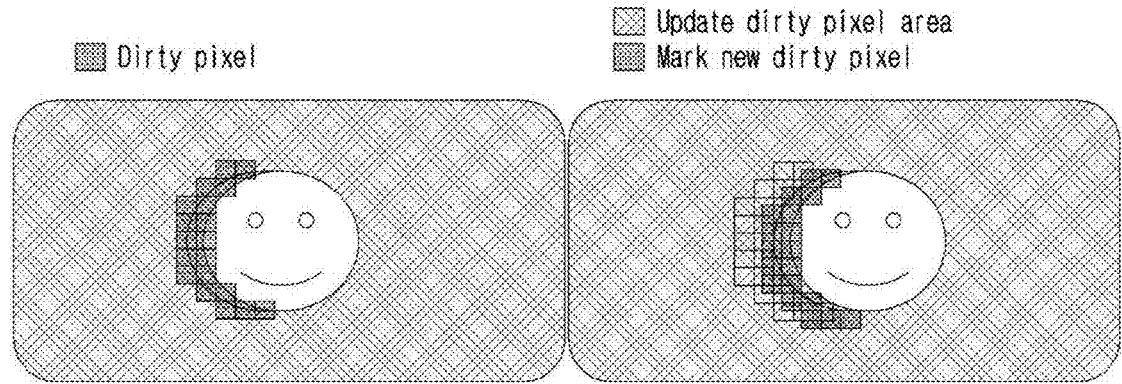

【FIG. 16】

METHOD FOR DECODING IMMERSIVE VIDEO AND METHOD FOR ENCODING IMMERSIVE VIDEO

CROSS-REFERENCE TO RELATED APPLICATIONS

Pursuant to 35 U.S.C 120 and 365(c), this application claims the benefit under 35 USC 119(a) of Korean Application No. 10-2023-0050344 filed on Apr. 17, 2023, Korean Application No. 10-2023-0133815 filed on Oct. 6, 2023, and Korean Application No. 10-2023-0140631 filed on Oct. 19, 2023, in the Korean Intellectual Property Office, the entire disclosures of which are incorporated herein by reference for all purposes.

FIELD OF INVENTION

The present disclosure relates to a method for encoding/decoding an immersive video which supports motion parallax for a rotation and translation motion.

BACKGROUND OF THE INVENTION

A virtual reality service is evolving in a direction of providing a service in which a sense of immersion and realism are maximized by generating an omnidirectional image in a form of an actual image or CG (Computer Graphics) and playing it on HMD, a smartphone, etc. Currently, it is known that 6 Degrees of Freedom (DoF) should be supported to play a natural and immersive omnidirectional image through HMD. For a 6DoF image, an image which is free in six directions including (1) left and right rotation, (2) top and bottom rotation, (3) left and right movement, (4) top and bottom movement, etc. should be provided through a HMD screen. But, most of the omnidirectional images based on an actual image support only rotary motion. Accordingly, a study on a field such as acquisition, reproduction technology, etc. of a 6DoF omnidirectional image is actively under way.

DISCLOSURE

Technical Problem

The present disclosure is to provide a method for separately processing a foreground and a background in encoding/decoding an image.

The present disclosure is to remove redundant data between background images by merging a plurality of background images spatially and/or temporally.

The present disclosure is to provide metadata related to separate processing of a background and a foreground.

The technical objects to be achieved by the present disclosure are not limited to the above-described technical objects, and other technical objects which are not described herein will be clearly understood by those skilled in the pertinent art from the following description.

Technical Solution

An image encoding method according to the present disclosure may include generating an atlas based on a plurality of viewpoint images; encoding the atlas; and encoding metadata for the atlas. In this case, the metadata may include first information showing whether a viewpoint image is a background image.

In an image encoding method according to the present disclosure, the first information is a 1-bit flag, and the flag may be encoded for each viewpoint image.

In an image encoding method according to the present disclosure, the first information is a layer identifier allocated to a viewpoint image, and a layer identifier allocated to the background image among viewpoint images may be 0.

In an image encoding method according to the present disclosure, the viewpoint image may be a merged background image generated by merging background images spatially or temporally.

In an image encoding method according to the present disclosure, spatial merge of the background images may be merging background images extracted from a plurality of images with a different viewpoint.

In an image encoding method according to the present disclosure, temporal merge of the background images may be merging background images extracted from a plurality of images with a different Picture Order Count (POC).

In an image encoding method according to the present disclosure, a temporally merged background image may be generated by updating an empty pixel in a representative background image based on a pixel value of a reference background frame, and the empty pixel may be included in a region occupied by a foreground object in a viewpoint image where the representative background image is extracted.

In an image encoding method according to the present disclosure, a pixel around a region occupied by the foreground object in the representative background image may be set as a dirty pixel, and the dirty pixel may be updated by the reference background image.

In an image encoding method according to the present disclosure, the metadata may further include information indicating a merge type of the merged background image.

In an image encoding method according to the present disclosure, the merge type may be one of spatial merge, temporal merge or spatiotemporal merge.

In an image encoding method according to the present disclosure, the metadata may further include second information showing whether viewpoint images are separated into a background and a foreground and processed.

An image decoding method according to the present disclosure may include decoding an atlas; decoding metadata for the atlas; and synthesizing an image for a target viewpoint by using the decoded atlas and the decoded metadata. In this case, the metadata may include first information showing whether a viewpoint image is a background image.

In an image decoding method according to the present disclosure, the first information is a 1-bit flag, and the flag may be decoded for each viewpoint image.

In an image decoding method according to the present disclosure, the first information is a layer identifier allocated to a viewpoint image, and a layer identifier allocated to the background image among viewpoint images may be 0.

In an image decoding method according to the present disclosure, the metadata further includes information showing whether viewpoint images are separated into a background and a foreground and processed, and the first information may be decoded when the second information shows that a background and a foreground are separated and processed.

The technical objects to be achieved by the present disclosure are not limited to the above-described technical objects, and other technical objects which are not described herein will be clearly understood by those skilled in the pertinent art from the following description.

Technical Effects

According to the present disclosure, image encoding/decoding efficiency may be improved by separately processing a foreground and a background.

According to the present disclosure, a plurality of background images may be merged spatially and/or temporally to remove redundant data between background images and accordingly, reduce encoded/decoded data.

According to the present disclosure, rendering flexibility in a decoder may be improved by providing metadata related to separate processing of a background and a foreground.

Effects achievable by the present disclosure are not limited to the above-described effects, and other effects which are not described herein may be clearly understood by those skilled in the pertinent art from the following description.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1 is a block diagram of an immersive video processing device according to an embodiment of the present disclosure.

FIG. 2 is a block diagram of an immersive video output device according to an embodiment of the present disclosure.

FIG. 3 is a flow chart of an immersive video processing method.

FIG. 4 is a flow chart of an atlas encoding process.

FIG. 5 is a flow chart of an immersive video output method.

FIG. 6 is a flowchart of a STM technique according to an embodiment of the present disclosure.

FIG. 7 illustrates an entity map.

FIG. 8 shows a difference according to a processing method of an entity boundary pixel.

FIGS. 9 and 10 show an example in which data from a plurality of views is rearranged into a single view.

FIG. 11 illustrates a center view frame generated by utilizing TMIV renderer implementation.

FIG. 12 shows an example in which an empty space corresponding to a foreground entity is filled.

FIG. 13 illustrates a shadow effect occurring at a boundary of a foreground object, and FIG. 14 shows an example in which an error according to a shadow effect of a foreground object occurs in a temporally merged background frame.

FIG. 15 shows an example in which a pixel around a foreground object is set as a dirty pixel, and FIG. 16 shows a GOP background frame generated by merging a background frame in which a pixel around a foreground object is set as a dirty pixel with a reference pixel.

BEST MODE

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An immersive video, when a user's viewing position is changed, refers to a video that a viewport image may be also dynamically changed. In order to implement an immersive video, a plurality of input images are required. Each of a plurality of input images may be referred to as a source image or a view image. A different view index may be assigned to each view image. An immersive image may be composed of images each of which has different view, thus, the immersive video can also be referred to as multi-view image.

An immersive video may be classified into 3DoF (Degree of Freedom), 3DoF+, Windowed-6DoF or 6DoF type, etc. A 3DoF-based immersive video may be implemented by using only a texture image. On the other hand, in order to render an immersive video including depth information such as 3DoF+ or 6DoF, etc., a depth image (or, a depth map) as well as a texture image is also required.

It is assumed that embodiments described below are for immersive video processing including depth information such as 3DoF+ and/or 6DoF, etc. In addition, it is assumed that a view image is configured with a texture image and a depth image.

FIG. 1 is a block diagram of an immersive video processing device according to an embodiment of the present disclosure.

In reference to FIG. 1, an immersive video processing device according to the present disclosure may include a view optimizer 110, an atlas generation unit 120, a metadata generation unit 130, an image encoding unit 140 and a bitstream generation unit 150.

An immersive video processing device receives a plurality of pairs of images, a camera intrinsic parameters and a camera extrinsic parameter as an input data to encode an immersive video. Here, a plurality of pairs of images include a texture image (Attribute component) and a depth image (Geometry component). Each pair may have a different view. Accordingly, a pair of input images may be referred to as a view image. Each of view images may be divided by an index. In this case, an index assigned to each view image may be referred to as a view or a view index.

A camera intrinsic parameters includes a focal distance, a position of a principal point, etc. and a camera extrinsic parameters includes translations, rotations, etc. of a camera. A camera intrinsic parameters and a camera extrinsic parameters may be treated as a camera parameter or a view parameter.

A view optimizer 110 partitions view images into a plurality of groups. As view images are partitioned into a plurality of groups, independent encoding processing per each group may be performed. In an example, view images captured by N spatially consecutive cameras may be classified into one group. Thereby, view images that depth information is relatively coherent may be put in one group and accordingly, rendering quality may be improved.

In addition, by removing dependence of information between groups, a spatial random access service which performs rendering by selectively bringing only information in a region that a user is watching may be made available.

Whether view images will be partitioned into a plurality of groups may be optional.

In addition, a view optimizer 110 may classify view images into a basic image and an additional image. A basic image represents an image which is not pruned as a view image with a highest pruning priority and an additional image represents a view image with a pruning priority lower than a basic image.

A view optimizer 110 may determine at least one of view images as a basic image. A view image which is not selected as a basic image may be classified as an additional image.

A view optimizer 110 may determine a basic image by considering a view position of a view image. In an example, a view image whose view position is the center among a plurality of view images may be selected as a basic image.

Alternatively, a view optimizer 110 may select a basic image based on camera parameters. Specifically, a view optimizer 110 may select a basic image based on at least one of a camera index, a priority between cameras, a position of a camera or whether it is a camera in a region of interest.

In an example, at least one of a view image with a smallest camera index, a view image with a largest camera index, a view image with the same camera index as a predefined value, a view image captured by a camera with a highest priority, a view image captured by a camera with a lowest priority, a view image captured by a camera at a predefined position (e.g., a central position) or a view image captured by a camera in a region of interest may be determined as a basic image.

Alternatively, a view optimizer 110 may determine a basic image based on quality of view images. In an example, a view image with highest quality among view images may be determined as a basic image.

Alternatively, a view optimizer 110 may determine a basic image by considering an overlapping data rate of other view images after inspecting a degree of data redundancy between view images. In an example, a view image with a highest overlapping data rate with other view images or a view image with a lowest overlapping data rate with other view images may be determined as a basic image.

A plurality of view images may be also configured as a basic image.

An Atlas generation unit 120 performs pruning and generates a pruning mask. And, it extracts a patch by using a pruning mask and generates an atlas by combining a basic image and/or an extracted patch. When view images are partitioned into a plurality of groups, the process may be performed independently per each group.

A generated atlas may be composed of a texture atlas and a depth atlas. A texture atlas represents a basic texture image and/or an image that texture patches are combined and a depth atlas represents a basic depth image and/or an image that depth patches are combined.

An atlas generation unit 120 may include a pruning unit 122, an aggregation unit 124 and a patch packing unit 126.

A pruning unit 122 performs pruning for an additional image based on a pruning priority. Specifically, pruning for an additional image may be performed by using a reference image with a higher pruning priority than an additional image.

A reference image includes a basic image. In addition, according to a pruning priority of an additional image, a reference image may further include other additional image.

Whether an additional image may be used as a reference image may be selectively determined. In an example, when an additional image is configured not to be used as a reference image, only a basic image may be configured as a reference image.

On the other hand, when an additional image is configured to be used as a reference image, a basic image and other additional image with a higher pruning priority than an additional image may be configured as a reference image.

Through a pruning process, redundant data between an additional image and a reference image may be removed. Specifically, through a warping process based on a depth image, data overlapped with a reference image may be removed in an additional image. In an example, when a depth value between an additional image and a reference image is compared and that difference is equal to or less than a threshold value, it may be determined that a corresponding pixel is redundant data.

As a result of pruning, a pruning mask including information on whether each pixel in an additional image is valid or invalid may be generated. A pruning mask may be a binary image which represents whether each pixel in an additional image is valid or invalid. In an example, in a pruning mask, a pixel determined as overlapping data with a reference image may have a value of 0 and a pixel determined as non-overlapping data with a reference image may have a value of 1.

While a non-overlapping region may have a non-square shape, a patch is limited to a square shape. Accordingly, a patch may include an invalid region as well as a valid region. Here, a valid region refers to a region composed of non-overlapping pixels between an additional image and a reference image. In other words, a valid region represents a region that includes data which is included in an additional image, but is not included in a reference image. An invalid region refers to a region composed of overlapping pixels between an additional image and a reference image. A pixel/data included by a valid region may be referred to as a valid pixel/valid data and a pixel/data included by an invalid region may be referred to as an invalid pixel/invalid data.

An aggregation unit 124 combines a pruning mask generated in a frame unit in an intra-period unit.

In addition, an aggregation unit 124 may extract a patch from a combined pruning mask image through a clustering process. Specifically, a square region including valid data in a combined pruning mask image may be extracted as a patch. Regardless of a shape of a valid region, a patch is extracted in a square shape, so a patch extracted from a square valid region may include invalid data as well as valid data.

In this case, an aggregation unit 124 may repartition a L-shaped or C-shaped patch which reduces encoding efficiency. Here, a L-shaped patch represents that distribution of a valid region is L-shaped and a C-shaped patch represents that distribution of a valid region is C-shaped.

When distribution of a valid region is L-shaped or C-shaped, a region occupied by an invalid region in a patch is relatively large. Accordingly, a L-shaped or C-shaped patch may be partitioned into a plurality of patches to improve encoding efficiency.

For an unpruned view image, a whole view image may be treated as one patch. Specifically, a whole 2D image which develops an unpruned view image in a predetermined projection format may be treated as one patch. A projection format may include at least one of an Equirectangular Projection Format (ERP), a Cube-map or a Perspective Projection Format.

Here, an unpruned view image refers to a basic image with a highest pruning priority. Alternatively, an additional image that there is no overlapping data with a reference image and a basic image may be defined as an unpruned view image. Alternatively, regardless of whether there is overlapping data with a reference image, an additional image arbitrarily excluded from a pruning target may be also defined as an unpruned view image. In other words, even an additional image that there is data overlapping with a reference image may be defined as an unpruned view image.

A packing unit 126 packs a patch in a rectangle image. In patch packing, deformation such as size transform, rotation, or flip, etc. of a patch may be accompanied. An image that patches are packed may be defined as an atlas.

Specifically, a packing unit 126 may generate a texture atlas by packing a basic texture image and/or texture patches and may generate a depth atlas by packing a basic depth image and/or depth patches.

For a basic image, a whole basic image may be treated as one patch. In other words, a basic image may be packed in an atlas as it is. When a whole image is treated as one patch, a corresponding patch may be referred to as a complete image (complete view) or a complete patch.

The number of atlases generated by an atlas generation unit 120 may be determined based on at least one of an arrangement structure of a camera rig, accuracy of a depth map or the number of view images.

A metadata generation unit 130 generates metadata for image synthesis. Metadata may include at least one of camera-related data, pruning-related data, atlas-related data or patch-related data.

Pruning-related data includes information for determining a pruning priority between view images. In an example, at least one of a flag representing whether a view image is a root node or a flag representing whether a view image is a leaf node may be encoded. A root node represents a view image with a highest pruning priority (i.e., a basic image) and a leaf node represents a view image with a lowest pruning priority.

When a view image is not a root node, a parent node index may be additionally encoded. A parent node index may represent an image index of a view image, a parent node.

Alternatively, when a view image is not a leaf node, a child node index may be additionally encoded. A child node index may represent an image index of a view image, a child node.

Atlas-related data may include at least one of size information of an atlas, number information of an atlas, priority information between atlases or a flag representing whether an atlas includes a complete image. A size of an atlas may include at least one of size information of a texture atlas and size information of a depth atlas. In this case, a flag representing whether a size of a depth atlas is the same as that of a texture atlas may be additionally encoded.

When a size of a depth atlas is different from that of a texture atlas, reduction ratio information of a depth atlas (e.g., scaling-related information) may be additionally encoded. Atlas-related information may be included in a "View parameters list" item in a bitstream.

In an example, geometry_scale_enabled_flag, a syntax representing whether it is allowed to reduce a depth atlas, may be encoded/decoded. When a value of a syntax geometry_scale_enabled_flag is 0, it represents that it is not allowed to reduce a depth atlas. In this case, a depth atlas has the same size as a texture atlas.

When a value of a syntax geometry_scale_enabled_flag is 1, it represents that it is allowed to reduce a depth atlas. In this case, information for determining a reduction ratio of a depth atlas may be additionally encoded/decoded. In an example, geometry_scaling_factor_x, a syntax representing a horizontal directional reduction ratio of a depth atlas, and geometry_scaling_factor_y, a syntax representing a vertical directional reduction ratio of a depth atlas, may be additionally encoded/decoded.

An immersive video output device may restore a reduced depth atlas to its original size after decoding information on a reduction ratio of a depth atlas.

Patch-related data includes information for specifying a position and/or a size of a patch in an atlas image, a view image to which a patch belongs and a position and/or a size of a patch in a view image. In an example, at least one of position information representing a position of a patch in an atlas image or size information representing a size of a patch in an atlas image may be encoded. In addition, a source index for identifying a view image from which a patch is derived may be encoded. A source index represents an index of a view image, an original source of a patch. In addition, position information representing a position corresponding to a patch in a view image or position information representing a size corresponding to a patch in a view image may be encoded. Patch-related information may be included in an "Atlas data" item in a bitstream.

An image encoding unit 140 encodes an atlas. When view images are classified into a plurality of groups, an atlas may be generated per group. Accordingly, image encoding may be performed independently per group.

An image encoding unit 140 may include a texture image encoding unit 142 encoding a texture atlas and a depth image encoding unit 144 encoding a depth atlas.

A bitstream generation unit 150 generates a bitstream based on encoded image data and metadata. A generated bitstream may be transmitted to an immersive video output device.

FIG. 2 is a block diagram of an immersive video output device according to an embodiment of the present disclosure.

In reference to FIG. 2, an immersive video output device according to the present disclosure may include a bitstream parsing unit 210, an image decoding unit 220, a metadata processing unit 230 and an image synthesizing unit 240.

A bitstream parsing unit 210 parses image data and metadata from a bitstream. Image data may include data of an encoded atlas. When a spatial random access service is supported, only a partial bitstream including a watching position of a user may be received.

An image decoding unit 220 decodes parsed image data. An image decoding unit 220 may include a texture image decoding unit 222 for decoding a texture atlas and a depth image decoding unit 224 for decoding a depth atlas.

A metadata processing unit 230 unformats parsed metadata.

Unformatted metadata may be used to synthesize a specific view image. In an example, when motion information of a user is input to an immersive video output device, a metadata processing unit 230 may determine an atlas necessary for image synthesis and patches necessary for image synthesis and/or a position/a size of the patches in an atlas and others to reproduce a viewport image according to a user's motion.

An image synthesizing unit 240 may dynamically synthesize a viewport image according to a user's motion. Specifically, an image synthesizing unit 240 may extract patches required to synthesize a viewport image from an atlas by using information determined in a metadata processing unit 230 according to a user's motion. Specifically, a viewport image may be generated by extracting patches extracted from an atlas including information of a view image required to synthesize a viewport image and the view image in the atlas and synthesizing extracted patches.

FIGS. 3 and 5 show a flow chart of an immersive video processing method and an immersive video output method, respectively.

In the following flow charts, what is italicized or underlined represents input or output data for performing each step. In addition, in the following flow charts, an arrow represents processing order of each step. In this case, steps without an arrow indicate that temporal order between corresponding steps is not determined or that corresponding steps may be processed in parallel. In addition, it is also possible to process or output an immersive video in order different from that shown in the following flow charts.

An immersive video processing device may receive at least one of a plurality of input images, a camera internal variable and a camera external variable and evaluate depth map quality through input data S301. Here, an input image may be configured with a pair of a texture image (Attribute component) and a depth image (Geometry component).

An immersive video processing device may classify input images into a plurality of groups based on positional proximity of a plurality of cameras S302. By classifying input images into a plurality of groups, pruning and encoding may be performed independently between adjacent cameras whose depth value is relatively coherent. In addition, through the process, a spatial random access service that rendering is performed by using only information of a region a user is watching may be enabled.

But, the above-described S301 and S302 are just an optional procedure and this process is not necessarily performed.

When input images are classified into a plurality of groups, procedures which will be described below may be performed independently per group.

An immersive video processing device may determine a pruning priority of view images S303. Specifically, view images may be classified into a basic image and an additional image and a pruning priority between additional images may be configured.

Subsequently, based on a pruning priority, an atlas may be generated and a generated atlas may be encoded S304. A process of encoding atlases is shown in detail in FIG. 4.

Specifically, a pruning parameter (e.g., a pruning priority, etc.) may be determined S311 and based on a determined pruning parameter, pruning may be performed for view images S312. As a result of pruning, a basic image with a highest priority is maintained as it is originally. On the other hand, through pruning for an additional image, overlapping data between an additional image and a reference image is removed. Through a warping process based on a depth image, overlapping data between an additional image and a reference image may be removed.

As a result of pruning, a pruning mask may be generated. If a pruning mask is generated, a pruning mask is combined in a unit of an intra-period S313. And, a patch may be extracted from a texture image and a depth image by using a combined pruning mask S314.

Specifically, a combined pruning mask may be masked to texture images and depth images to extract a patch.

In this case, for a non-pruned view image (e.g., a basic image), a whole view image may be treated as one patch.

Subsequently, extracted patches may be packed S315 and an atlas may be generated S316. Specifically, a texture atlas and a depth atlas may be generated.

In addition, an immersive video processing device may determine a threshold value for determining whether a pixel is valid or invalid based on a depth atlas S317. In an example, a pixel that a value in an atlas is smaller than a threshold value may correspond to an invalid pixel and a pixel that a value is equal to or greater than a threshold value may correspond to a valid pixel. A threshold value may be determined in a unit of an image or may be determined in a unit of a patch.

For reducing the amount of data, a size of a depth atlas may be reduced by a specific ratio S318. When a size of a depth atlas is reduced, information on a reduction ratio of a depth atlas (e.g., a scaling factor) may be encoded. In an immersive video output device, a reduced depth atlas may be restored to its original size through a scaling factor and a size of a texture atlas.

Metadata generated in an atlas encoding process (e.g., a parameter set, a view parameter list or atlas data, etc.) and SEI (Supplemental Enhancement Information) are combined S305. In addition, a sub bitstream may be generated by encoding a texture atlas and a depth atlas respectively S306, and a single bitstream may be generated by multiplexing encoded metadata and an encoded atlas S307.

An immersive video output device demultiplexes a bitstream received from an immersive video processing device S501. As a result, video data, i.e., atlas data and metadata may be extracted respectively S502 and S503.

An immersive video output device may restore an atlas based on parsed video data S504. In this case, when a depth atlas is reduced at a specific ratio, a depth atlas may be scaled to its original size by acquiring related information from metadata S505.

When a user's motion occurs, based on metadata, an atlas required to synthesize a viewport image according to a user's motion may be determined and patches included in the atlas may be extracted. A viewport image may be generated and rendered S506. In this case, in order to synthesize viewpoint image with the patches, size/position information of each patch and a camera parameter, etc. may be used.

In the present disclosure, a spatio-temporal merge (STM) technique is proposed to improve MIV sequence encoding efficiency and reduce decoding complexity. With a STM technique proposed in the present disclosure, an effect of improving encoding efficiency and reducing decoding complexity and rendering complexity may be generated. Specifically, an embodiment to be described in the present disclosure includes a process of separating a background and foreground frame from a MIV sequence in a unit of a GOP.

Each of a separated background frame and foreground frame may be encoded/decoded independently.

A key term proposed in the present disclosure may be defined as follows.

A spatio-temporal merge (STM) technique: A STM technique is to merge multiple background frames into a single background frame (i.e., temporal merge) or merge multiple views into a single center view background frame (i.e., spatial merge) for a given GOP. When using a STM technique, a method may improve coding efficiency and reduce decoding and rendering complexity by reducing the overlap of background frames between consecutive images or between a plurality of viewpoints.

Separation of Background and Foreground: It shows separating a background frame and a foreground frame from a MIV sequence within a GOP unit. If a background frame and a foreground frame are separated, each of a background patch and a foreground patch may be packed in a separate atlas. As an example, a background atlas in which only background patches are packed and a foreground atlas in which only foreground patches are packed may be generated, respectively. When a background and a foreground are separated, it may provide greater flexibility in processing a heterogeneous individual parameter such as duration and sampling speed.

In an embodiment described later, the encoding and decoding efficiency of a MIV sequence may be improved by applying the above-described STM technique and a background and foreground separation technique together. Specifically, a STM technique may contribute to improving coding efficiency and reducing decoding and rendering complexity by reducing the overlap of backgrounds of each viewpoint. A background and foreground separation technique may provide greater flexibility in processing a heterogeneous individual parameter.

Based on the above-described description, a STM technique proposed in the present disclosure will be described in detail below.

FIG. 6 is a flowchart of a STM technique according to an embodiment of the present disclosure.

First, a background and a foreground of a picture may be separately extracted S601. Specifically, for each picture belonging to a Group of Pictures (GOP), a foreground and a background may be separated. In this case, under the assumption that a background pixel has a static characteristic during a GOP period, each pixel included in one picture may be divided into a foreground pixel or a background pixel. In other words, all pixels belonging to a foreground object may have a geometrical position change during a GOP period.

Meanwhile, through this operation, one picture may be divided into a foreground frame and a background frame. Here, a foreground frame represents a picture composed only of foreground pixels, and a background frame represents a picture composed only of background pixels.

Based on an entity map, a background pixel may be also extracted from an original picture. Here, an entity map is used to define a background entity, and it may also include information on each object in a picture.

FIG. 7 illustrates an entity map.

Each object included in a picture may be defined as an entity. In addition, a unique identifier (ID) may be allocated to each entity. In an example shown in FIG. 7, an ID of background entities are 0 to 5, and an ID of foreground entities are 6 to 24.

An entity map may be examined to easily extract a background pixel from an original picture. In other words, a pixel in an original picture corresponding to a pixel occupied by a background entity on an entity map may be set as a background pixel.

In distinguishing between a foreground frame and a background frame based on an entity map, at least one of a method for preserving a foreground pixel forming an entity boundary or a method for discarding a boundary pixel forming an entity boundary may be applied. In this case, a method for extracting a foreground frame and a background frame may be set by considering a resolution difference between channels, i.e., that a resolution of an UV channel is relatively low compared to a Y channel. In other words, by considering that an image size for an UV channel is smaller than that of a Y channel, one of a method for extracting a background frame by preserving a foreground pixel or a method for extracting a background frame by discarding a foreground pixel may be used.

FIG. 8 shows a difference according to a processing method of an entity boundary pixel.

A left side of FIG. 8 shows an example in which a background frame is extracted by preserving a foreground pixel forming an entity boundary for an UV channel.

On the other hand, a right side of FIG. 8 shows an example in which a background frame is extracted by discarding a foreground pixel forming an entity boundary for an UV channel.

Meanwhile, a background frame may be generated by using a method for discarding a boundary pixel, and a foreground frame may be generated by using a method for preserving a boundary pixel. In this case, a shadow effect may appear around a boundary of a foreground object, correcting reconstruction quality.

After separating a picture into a foreground and a background, background data may be spatially merged S602. Specifically, a spatio-merge (SM) technique may be used to merge background frames extracted from pictures with a different viewpoint into one background frame.

In order to use a SM technique, a pixel coordinate may be transformed based on geometric information provided for a depth map. Specifically, a coordinate independently defined per each view may be transformed to a world coordinate based on a center view.

In other words, a depth map captured from an individual camera may be utilized to reconstruct a coordinate included in each view into a general world coordinate.

If coordinates transformed to world coordinates are reprojected onto a center view image plane, data extracted from each of a plurality of views may be rearranged into a single view.

FIGS. 9 and 10 show an example in which data from a plurality of views is rearranged into a single view.

FIG. 9 shows data extracted from each of a plurality of views, and FIG. 10 shows an example in which data in FIG. 9 is rearranged into a single view. Rearranged data shown in FIG. 10 may include all data extracted from each of a plurality of views shown in FIG. 9.

Meanwhile, a center view may represent a view including the most background data among a plurality of views. When a plurality of views are partitioned into a plurality of groups, a center view may be set for each group.

As in an example shown in FIGS. 9 and 10, a center view frame may be generated by rearranging background data extracted from each of a plurality of views into a single view. In other words, a center view frame may be a single view frame generated by reprojecting background data extracted from each of a plurality of views onto a center view image plane.

Meanwhile, in order to maintain an optimal spatial merge result, a center view frame may be also generated by using TMIV renderer implementation.

FIG. 11 illustrates a center view frame generated by utilizing TMIV renderer implementation.

Specifically, one center view may be created by using a TMIV renderer. However, in order to utilize spatial merge data according to a SM technique as input of a TMIV encoder/decoder, an inpainter function may be turned off for an optimal reference configuration.

Meanwhile, a plurality of viewpoints may be classified into a plurality of groups. In this case, an atlas may be generated per each group, and spatial merge may be performed by using only viewpoints belonging to an atlas. In other words, a spatially merged background frame may be generated per atlas.

A spatially merged background frame may be also merged on a temporal axis S603. Through temporal merge, background data of pictures with a different Picture Order Counter (POC) may be merged into one background frame. In order to merge a background frame along a temporal axis, a process of filling an empty space covered with a foreground entity within a background frame with background pixels may be performed.

FIG. 12 shows an example in which an empty space corresponding to a foreground entity is filled.

Specifically, an empty space occupied by a foreground entity in a current background frame may be filled with background pixels of reference data. Here, reference data may represent data included in a frame with a POC that is different from a POC of a current frame from which a current background frame is extracted. As an example, if a current frame is a frame with the smallest POC in a GOP, a reference frame may be a future frame with a larger POC than a current frame.

Meanwhile, a current frame may be a representative frame within a GOP period. Here, a representative frame may be a first frame within a GOP period (i.e., a frame with the smallest POC) or a frame with the smallest ratio occupied by a foreground object within a GOP period.

A background frame for the entire GOP period may be generated by combining all reference pixels within a GOP period to which a current background frame belongs with a current background frame. As a result, a background frame covering one GOP period may be generated. As a result, a background for one GOP period may be expressed with one background frame, reducing and simplifying the amount of data expressing a background. Meanwhile, a background frame for the entire GOP period may be referred to as a GOP background frame.

Meanwhile, in temporally merging a background frame, a shadow effect occurring at a boundary of a foreground object which may affect background quality must be considered.

FIG. 13 illustrates a shadow effect occurring at a boundary of a foreground object, and FIG. 14 shows an example in which an error according to a shadow effect of a foreground object occurs in a temporally merged background frame.

As in an example shown in FIG. 13, a shadow effect such as blur processing may occur around a foreground object. Due to this shadow effect, distortion may occur in a background pixel around a foreground object as in an example shown in FIG. 14.

In order to solve a problem caused by a shadow from a foreground object, a pixel around a foreground object may be set as a dirty pixel. Here, a dirty pixel may represent a pixel to be updated, i.e., a pixel replaced by a reference pixel.

FIG. 15 shows an example in which a pixel around a foreground object is set as a dirty pixel, and FIG. 16 shows a GOP background frame generated by merging a background frame in which a pixel around a foreground object is set as a dirty pixel with a reference pixel.

In order to preserve natural background data within a GOP period, a dirty pixel may be replaced with a reference pixel.

In other words, a dirty pixel may be processed in the same way as a pixel in an empty region occupied by a foreground object.

Alternatively, a dirty pixel may be updated based on a weighted sum operation of a reference background pixel and a dirty pixel. In this case, a weight for the weighted sum operation may be determined based on a distance from a boundary of a foreground object to the dirty pixel. As an example, when a dirty pixel is positioned close to a boundary of a foreground object, a weight allocated to a dirty pixel may have a smaller value than a weight allocated to a reference pixel. On the other hand, if a dirty pixel is positioned far from a boundary of a foreground object, a weight allocated to a dirty pixel may have a value equal to or greater than a weight allocated to a reference pixel.

As a background image is merged spatially and temporally according to the present disclosure, a merged background image may be used to reproduce a background for a target viewpoint. Specifically, an immersive image output device may determine a foreground object included in a target viewpoint to be reproduced and decode a foreground object included in a target viewpoint. Then, it may combine a decoded background image and a decoded foreground object to reproduce an image for a target viewpoint.

In FIG. 6, it was shown that temporal merge is performed after background data is spatially merged. Unlike an example shown, spatial merge may be performed after background data is temporally merged.

Each of merged background frames and foreground frames may be packed into a separate atlas. As an example, patches extracted from a merged background frame may be packed into a first atlas, and patches extracted from foreground frames may be packed into a second atlas. Here, a patch extracted from a background frame, i.e., an atlas generated by packing background patches may be referred to as a background atlas, and a patch extracted from a foreground frame, i.e., an atlas generated by packing foreground patches may be referred to as a foreground atlas.

Meanwhile, the number of background atlases may be equal to or smaller than the number of foreground atlases. As an example, when the number of foreground atlases is two, the number of background atlases may be one or two.

In the above-described example, it was exemplified that temporal merge is performed in a unit of a GOP period. Unlike a described example, temporal merge may be also performed in a unit of a predetermined number of pictures. Here, a predetermined number is an integer equal to or greater than 2, and it may be predefined in an encoder and a decoder. Alternatively, information representing a predetermined number may be encoded and signaled.

Meanwhile, in the above-described example, it was illustrated that a merged background frame (i.e., a merged background frame) is generated by merging background frames spatially and temporally. Unlike the above-described example, a merged background frame may be generated by merging background frames only spatially or temporally.

As an example, when background frames are merged only spatially, a merged background frame may be obtained per POC. On the other hand, when background frames are merged only temporally, a merged background frame may be obtained per viewpoint for a predetermined period (e.g., a GOP period).

Meanwhile, when a background and a foreground are separated and processed, reallocation processing of a viewpoint identifier may be performed.

As an example, a different viewpoint identifier may be allocated to each of a background and a foreground separated from a specific viewpoint image. In other words, one viewpoint image may be partitioned into a plurality of images (i.e., a background image and a foreground image), and a different viewpoint identifier may be allocated to each of a plurality of images.

Alternatively, background images extracted from viewpoint images may be merged to generate at least one background frame and then allocate a new viewpoint identifier to a merged background frame.

Alternatively, a different viewpoint identifier may be allocated to each foreground object.

When a picture is separated into a background and a foreground and processed, metadata separate from image data may be generated and encoded.

As an embodiment of the present disclosure, background information and foreground information may be identified by using a patch label. Specifically, information identifying whether a corresponding patch belongs to a background region or a foreground region may be encoded per patch.

Alternatively, an identifier of an entity related to a patch may be encoded/decoded, and information showing whether the entity is a foreground entity or a background entity may be encoded/decoded.

Alternatively, background-related information may be encoded/decoded through an atlas. Specifically, when a general foreground atlas and an additional atlas that requires an additional rendering process, i.e., a background atlas, are encoded/decoded separately, information showing whether an atlas is a foreground atlas or a background atlas may be encoded and signaled. Meanwhile, a foreground atlas follows a traditional decoding process, while an additional atlas may have a rendering process different from that of a foreground atlas.

Alternatively, at a sequence level, information related to background and foreground separation may be encoded and signaled. Specifically, through a sequence, information showing at least one of whether a background and a foreground are separated and processed, a background and foreground separate processing period or a frame rate may be encoded and signaled.

Table 1 illustrates a syntax structure including information related to background and foreground separation.

TABLE 1

|  | Descriptor |
|---|---|
| casps_miv_2_extension( ) { | |
| casme_decoder_side_depth_estimation_flag | u(1) |
| casme_chroma_scaling_present_flag | u(1) |
| casme_capture_device_information_present_flag | u(1) |
| if( casme_capture_device_information_present_flag ) | |
| capture_device_information( ) | |
| casme_background_seperation_enable_flag | u(1) |
| casme_reserved_zero_8bits | u(8) |
| } | |

17
18

In Table 1, a syntax, casme_background_separation_enabled_flag shows whether data related to separate processing into a background and a foreground exists in a bitstream. As an example, when a value of the flag is 1, it shows that viewpoint images are separated into a background and a foreground and processed. In this case, information related to separate processing between a background and a foreground may exist in a bitstream. On the other hand, when a value of the flag is 0, it shows that viewpoint images are not separated into a background and a foreground. In this case, information related to separate processing between a background and a foreground may not exist in a bitstream.

The information may be encoded and signaled through a sequence parameter set for an atlas (e.g., a Common Atlas Sequence Parameter Set, casps), as illustrated in Table 1.

Meanwhile, a background frame may be generated only when viewpoint images are separated into a background and a foreground and processed. In other words, when a spatially and/or temporally merged background frame is encoded/decoded, a value of the flag must be set as 1.

Separately from the information, information showing whether a background frame is merged may be additionally encoded/decoded. As an example, if a value of a flag showing that viewpoint images are separated into a background and a foreground and processed is true (i.e., 1), information showing whether a merged background frame is encoded/decoded may be additionally encoded/decoded. Information showing whether a merged background frame is encoded/decoded may be encoded/decoded through a sequence parameter set for an atlas (e.g., a Common Atlas Sequence Parameter Set) or may be encoded at a different level.

If the information shows that a merged background frame is encoded/decoded, information related to a merge type may be additionally encoded/decoded. The merge type may indicate one of spatial merge, temporal merge, or spatial and temporal merge.

Meanwhile, a merge type of a background frame may be independently determined per atlas. In other words, a merge type for a first atlas and a merge type for a second atlas may be different from each other. Alternatively, a merge type of a background frame may be independently determined between a color image and a depth image. In other words, a merge type for a color image and a merge type for a depth image may be different from each other.

Meanwhile, information showing whether a current viewpoint corresponds to a background frame may be encoded and signaled per viewpoint.

Table 2 illustrates a syntax structure including the information. In Table 2, it was exemplified that the information is encoded/decoded through a View Parameter Set (mvp).

TABLE 2

| miv_view_params_list( ) { | |
| --- | --- |
| ... ... | |
| if (casme_background_seperation_enable_flag) | |
| for( v = 0; v <= mvp_num_views_minus1; v++ ) { | |
| mvp_view_background_flag[v] | u(1) |
| } | |
| ... ... | |
| } | |

In Table 2, a syntax, mvp_view_background_flag[v] shows whether data for a viewpoint whose viewpoint ID (view id) is v is a foreground or a background. As an example, when a value of a syntax, mvp_view_background_flag[v] is 1, it shows that a view whose identifier is v is a background frame or that a foreground object is not included at a corresponding viewpoint. On the other hand, when a value of a syntax, mvp_view_background_flag[v] is 0, it shows that a view whose identifier is v is not a background or that a foreground object is included at a corresponding viewpoint.

In a decoder, a foreground and a background may be separated and processed by using the flag information.

Meanwhile, when a merged background frame is generated by merging background frames spatially and/or temporally, a unique viewpoint identifier (i.e., view id) may be also allocated to a merged background frame. In this case, the syntax, mvp_view_background_flag[v] may be also encoded/decoded for a merged background frame. A value of a syntax, mvp_view_background_flag[v] for a merged background frame may be set as 1.

A plurality of merged background frames may be encoded/decoded. Accordingly, at least one of information showing the number of merged background frames or information for distinguishing a plurality of merged background frames may be encoded/decoded. As an example, when two merged background frames exist, a flag for distinguishing between a first background frame and a second background frame may be encoded and signaled.

In addition, at least one of spatial merge information or temporal merge information of a merged background frame may be encoded. Here, spatial merge information may include at least one of viewpoints used to generate a merged background frame, the number of viewpoints or an identifier of a corresponding atlas. In addition, temporal merge information may show the number of consecutive frames that are temporally merged. As an example, the number of consecutive frames indicated by temporal merge information may be equal to or smaller than the number of frames constituting a GOP. In this case, spatial merge information and/or temporal merge information may be encoded/decoded based on a frame where temporal merge newly starts (e.g., a first frame of a GOP). In addition, at least one of spatial merge information and/or temporal merge information may be encoded and signaled in a unit of an atlas, a viewpoint or a patch.

Non-background regions may be also separated into a plurality of layers and processed. Here, a non-background region shows a region/an image that does not consist of only backgrounds, and it may include at least one of a viewpoint including a foreground or a foreground entity. In this case, related information may be additionally encoded/decoded. Table 3 illustrates a syntax structure including layer-related information of non-background regions.

TABLE 3

| miv_view_params_list( ) { | |
| --- | --- |
| ... ... | |
| if (casme_background_seperation_enable_flag) | |
| mvp_num_non_backgrounds_minus1 | u(16) |
| for( v = 0; v <= mvp_num_views_minus1; v++ ) { | |
| mvp_view_background_flag[v] | u(1) |
| if (!mvp_view_background_flag[v]) | |
| mvp_view_non_background_id[v] | u(16) |
| } | |
| ... ... | |
| } | |

In Table 3, a syntax, mvp_num_non_backgrounds_minus1 may show the number of non-background regions, i.e., the number of layers.

When a plurality of layers exist, identification information, i.e., mvp_view_non_background_id[v] may be encoded/decoded for each layer. As an example, a syntax, mvp_view_non_background_id[v] shows a layer ID at a viewpoint when an identifier is v.

In the above-described example, it was illustrated that only non-background regions are separated into a plurality of layers and processed. Unlike an example described, a unit processed by being separated into a plurality of layers may include a background region as well as a non-background region. Table 4 shows an example thereof.

TABLE 4

```
miv_view_params_list( ) {
... ...
if (casme_layer_seperation_enable_flag)
mvp_num_layers_minus1                    u(16)
for( v = 0; v <= mvp_num_views_minus1; v++ ) {
mvp_view_layer_id[v]                     u(16)
}
... ...
}
```

In an example shown in Table 4, mvp_num_layers_minus1 shows the number of layers. A syntax, mvp_view_layer_id[v] shows a layer ID allocated at a viewpoint when an identifier is v.

In this case, an identifier of a layer allocated to a background region, i.e., layer-id may be the smallest value, e.g., 0. If an identifier of a layer, i.e., layer_id is the largest value (i.e., like mvp_num_layers_minus1), it means that a corresponding layer is positioned at the very front.

Meanwhile, when a background viewpoint is identified by an identifier of a layer, encoding/decoding of mvp_view_background_flag[v] showing whether a specific viewpoint is a background may be omitted.

A name of syntax elements introduced in the above-described embodiments is only temporarily given to describe embodiments according to the present disclosure. Syntax elements may be named with a name different from that proposed in the present disclosure.

A component described in illustrative embodiments of the present disclosure may be implemented by a hardware element. For example, the hardware element may include at least one of a digital signal processor (DSP), a processor, a controller, an application-specific integrated circuit (ASIC), a programmable logic element such as a FPGA, a GPU, other electronic device, or a combination thereof. At least some of functions or processes described in illustrative embodiments of the present disclosure may be implemented by a software and a software may be recorded in a recording medium. A component, a function and a process described in illustrative embodiments may be implemented by a combination of a hardware and a software.

A method according to an embodiment of the present disclosure may be implemented by a program which may be performed by a computer and the computer program may be recorded in a variety of recording media such as a magnetic Storage medium, an optical readout medium, a digital storage medium, etc.

A variety of technologies described in the present disclosure may be implemented by a digital electronic circuit, a computer hardware, a firmware, a software or a combination thereof. The technologies may be implemented by a computer program product, i.e., a computer program tangibly implemented on an information medium or a computer program processed by a computer program (e.g., a machine readable storage device (e.g.: a computer readable medium) or a data processing device) or a data processing device or implemented by a signal propagated to operate a data processing device (e.g., a programmable processor, a computer or a plurality of computers).

Computer program(s) may be written in any form of a programming language including a compiled language or an interpreted language and may be distributed in any form including a stand-alone program or module, a component, a subroutine, or other unit suitable for use in a computing environment. A computer program may be performed by one computer or a plurality of computers which are spread in one site or multiple sites and are interconnected by a communication network.

An example of a processor suitable for executing a computer program includes a general-purpose and special-purpose microprocessor and one or more processors of a digital computer. Generally, a processor receives an instruction and data in a read-only memory or a random access memory or both of them. A component of a computer may include at least one processor for executing an instruction and at least one memory device for storing an instruction and data. In addition, a computer may include one or more mass storage devices for storing data, e.g., a magnetic disk, a magnet-optical disk or an optical disk, or may be connected to the mass storage device to receive and/or transmit data. An example of an information medium suitable for implementing a computer program instruction and data includes a semiconductor memory device (e.g., a magnetic medium such as a hard disk, a floppy disk and a magnetic tape), an optical medium such as a compact disk read-only memory (CD-ROM), a digital video disk (DVD), etc., a magnet-optical medium such as a floptical disk, and a ROM (Read Only Memory), a RAM (Random Access Memory), a flash memory, an EPROM (Erasable Programmable ROM), an EEPROM (Electrically Erasable Programmable ROM) and other known computer readable medium. A processor and a memory may be complemented or integrated by a special-purpose logic circuit.

A processor may execute an operating system (OS) and one or more software applications executed in an OS. A processor device may also respond to software execution to access, store, manipulate, process and generate data. For simplicity, a processor device is described in the singular, but those skilled in the art may understand that a processor device may include a plurality of processing elements and/or various types of processing elements. For example, a processor device may include a plurality of processors or a processor and a controller. In addition, it may configure a different processing structure like parallel processors. In addition, a computer readable medium means all media which may be accessed by a computer and may include both a computer storage medium and a transmission medium.

The present disclosure includes detailed description of various detailed implementation examples, but it should be understood that those details do not limit a scope of claims or an invention proposed in the present disclosure and they describe features of a specific illustrative embodiment.

Features which are individually described in illustrative embodiments of the present disclosure may be implemented by a single illustrative embodiment. Conversely, a variety of features described regarding a single illustrative embodiment in the present disclosure may be implemented by a combination or a proper sub-combination of a plurality of illustrative embodiments. Further, in the present disclosure, the features may be operated by a specific combination and may be described as the combination is initially claimed, but in some cases, one or more features may be excluded from a claimed combination or a claimed combination may be changed in a form of a sub-combination or a modified sub-combination.

Likewise, although an operation is described in specific order in a drawing, it should not be understood that it is necessary to execute operations in specific turn or order or it is necessary to perform all operations in order to achieve a desired result. In a specific case, multitasking and parallel processing may be useful. In addition, it should not be understood that a variety of device components should be separated in illustrative embodiments of all embodiments and the above-described program component and device may be packaged into a single software product or multiple software products.

Illustrative embodiments disclosed herein are just illustrative and do not limit a scope of the present disclosure. Those skilled in the art may recognize that illustrative embodiments may be variously modified without departing from a claim and a spirit and a scope of its equivalent.

Accordingly, the present disclosure includes all other replacements, modifications and changes belonging to the following claim.

The invention claimed is:

1. An image encoding method, the method comprising:
generating atlases based on a plurality of viewpoint images;
encoding the atlases; and
encoding metadata for the plurality of viewpoint images and the atlases,
wherein the metadata comprises a first flag indicating whether a viewpoint image is a background image or not, and
wherein the first flag is encoded for each of the plurality of viewpoint images.

2. The method of claim 1, wherein the background image is generated by merging spatial background images extracted from images captured at different positions.

3. The method of claim 1, wherein the background image is generated by merging temporal background images extracted from images captured on different timepoints.

4. The method of claim 3, wherein one of the temporal background images is designated as a representative background image, and
wherein the background image is generated by updating an empty pixel in the representative background image based on a pixel value of a reference background image,
the empty pixel being included in a region occupied by a foreground object in an image from which the representative background image is extracted.

5. The method of claim 4, wherein:
a pixel adjacent to a region occupied by the foreground object in the representative background image is set as a dirty pixel, and
wherein the dirty pixel is updated by the reference background image.

6. The method of claim 1, wherein the atlases comprise a background atlas and a foreground atlas, and
wherein the background atlas comprises only viewpoint images that are background images.

7. The method of claim 1, wherein
the metadata further comprises a second flag indicating separate processing of a background and a foreground is enabled, and
wherein the first flag is present in the metadata only when the second flag is encoded to indicate that separate processing of the background and the foreground is enabled.

8. An image decoding method, the method comprising:
decoding atlases;
decoding metadata for a plurality of viewpoint images and the atlases; and
synthesizing a target viewpoint image by using the decoded atlases and the decoded metadata,
wherein the metadata comprises a first flag indicating whether a viewpoint image is a background image or not, and
wherein the first flag is decoded for each of the plurality of viewpoint images.

9. The method of claim 8, wherein
the metadata further comprises a second flag indicating separate processing of a background and a foreground is enabled, and
wherein the first flag is present in the metadata only when the second flag indicates that separate processing of the background and the foreground is enabled.

10. A non-transitory computer readable recording medium comprising instructions when executed cause a computer to carry out:
generating atlases based on a plurality of viewpoint images;
encoding the atlases; and
encoding metadata for the plurality of viewpoint images and the atlases,
wherein the metadata comprises a first flag indicating whether a viewpoint image is a background image or not, and
wherein the first flag is encoded for each of the plurality of viewpoint images.

11. The method of claim 8, wherein the atlases comprise a background atlas and a foreground atlas, and
wherein the background atlas comprises only viewpoint images that are background images.

* * * * *